United States Patent
Bjorge et al.

(10) Patent No.: US 8,739,530 B2
(45) Date of Patent: Jun. 3, 2014

(54) COMPRESSOR FLOW CONTROL

(75) Inventors: Deborah M. Bjorge, Northville, MI (US); Julia Helen Buckland, Commerce Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 257 days.

(21) Appl. No.: 13/293,642

(22) Filed: Nov. 10, 2011

(65) Prior Publication Data

US 2013/0118166 A1 May 16, 2013

(51) Int. Cl.
*F02B 37/12* (2006.01)

(52) U.S. Cl.
USPC .................. 60/612; 60/611; 123/562

(58) Field of Classification Search
USPC ..................... 60/611–612; 123/562
See application file for complete search history.

(56) References Cited

U.S. PATENT DOCUMENTS

| 6,112,523 | A  | * | 9/2000  | Kamo et al. ........... 60/612 |
| 6,817,349 | B2 |   | 11/2004 | Awasaka et al. |
| 6,990,814 | B2 |   | 1/2006  | Boley et al. |
| 7,281,378 | B2 |   | 10/2007 | Gu et al. |
| 8,434,305 | B2 | * | 5/2013  | Donkin et al. ......... 60/611 |

FOREIGN PATENT DOCUMENTS

WO 2007122499 A1 11/2007

* cited by examiner

*Primary Examiner* — Thomas Denion
*Assistant Examiner* — Ngoc T Nguyen
(74) *Attorney, Agent, or Firm* — Julia Voutyras; Alleman Hall McCoy Russell & Tuttle LLP

(57) ABSTRACT

An engine system is provided. The system comprises an engine, first and second compressors supplying air to the engine, a first compressor recirculation valve adjustable to two restriction levels, and a second compressor recirculation valve adjustable to three or more restriction levels. In this way, the first and second compressor recirculation valves may be controlled to avoid compressor surge while providing a sufficient amount of boost to meet power demands.

17 Claims, 3 Drawing Sheets

COMPRESSOR FLOW CONTROL

FIELD

The present disclosure relates to compressor flow in a turbocharged engine.

BACKGROUND AND SUMMARY

Turbo charging an engine allows the engine to provide power similar to that of a larger displacement engine. Thus, turbo charging can extend the operating region of an engine. Turbochargers function by compressing intake air in a compressor via a turbine operated by exhaust gas flow. Under certain conditions, the flow rate and pressure ratio across the compressor can fluctuate to levels that may result in noise disturbances, and in more severe cases, performance issues and compressor degradation.

Such compressor surge may be mitigated by one or more compressor recirculation valves (CRV) located in the intake. The CRVs may recirculate compressed air from the compressor outlet to the compressor inlet. However, at some operating conditions, opening the CRV to mitigate noise issues may result in insufficient boost to meet current torque requests. Particularly, this may result in poor response in transient conditions, such as following a partial throttle tip-out.

The inventors have recognized the issues with the above approach and offer a system to at least partly address them. In one embodiment, an engine system comprises an engine, first and second compressors supplying air to the engine, a first compressor recirculation valve adjustable to two restriction levels, and a second compressor recirculation valve adjustable to three or more restriction levels.

In this way, the second, variably adjustable compressor recirculation valve may be operated to provide an adjustable amount of intake flow that recirculates through the compressor. The first compressor recirculation valve, which is a traditional on/off compressor recirculation valve, may be operated to alleviate compressor surge, for example, under high load conditions. Together, compressor surge may be mitigated by concerted control of both valves, leading to reduced noise disturbances while providing acceptable boost in transient conditions. Additionally, in engine systems that include a single turbocharger, the two compressor recirculation valves may be arranged in parallel to recirculation the one compressor, and controlled to mitigate surge.

The present disclosure may offer several advantages. For example, an engine that includes both the first and second compressor recirculation valves as described may be extensively downsized to improve engine efficiency and fuel economy, as the variably adjustable valve allows for engine operation close to the surge boundary while avoiding surge and providing sufficient boost. Boost under transient conditions may also be improved, as the variably controlled compressor recirculation valve allows for proper boost for adequate torque response following, for example, a sudden drop in engine load during an operator tip-out event.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
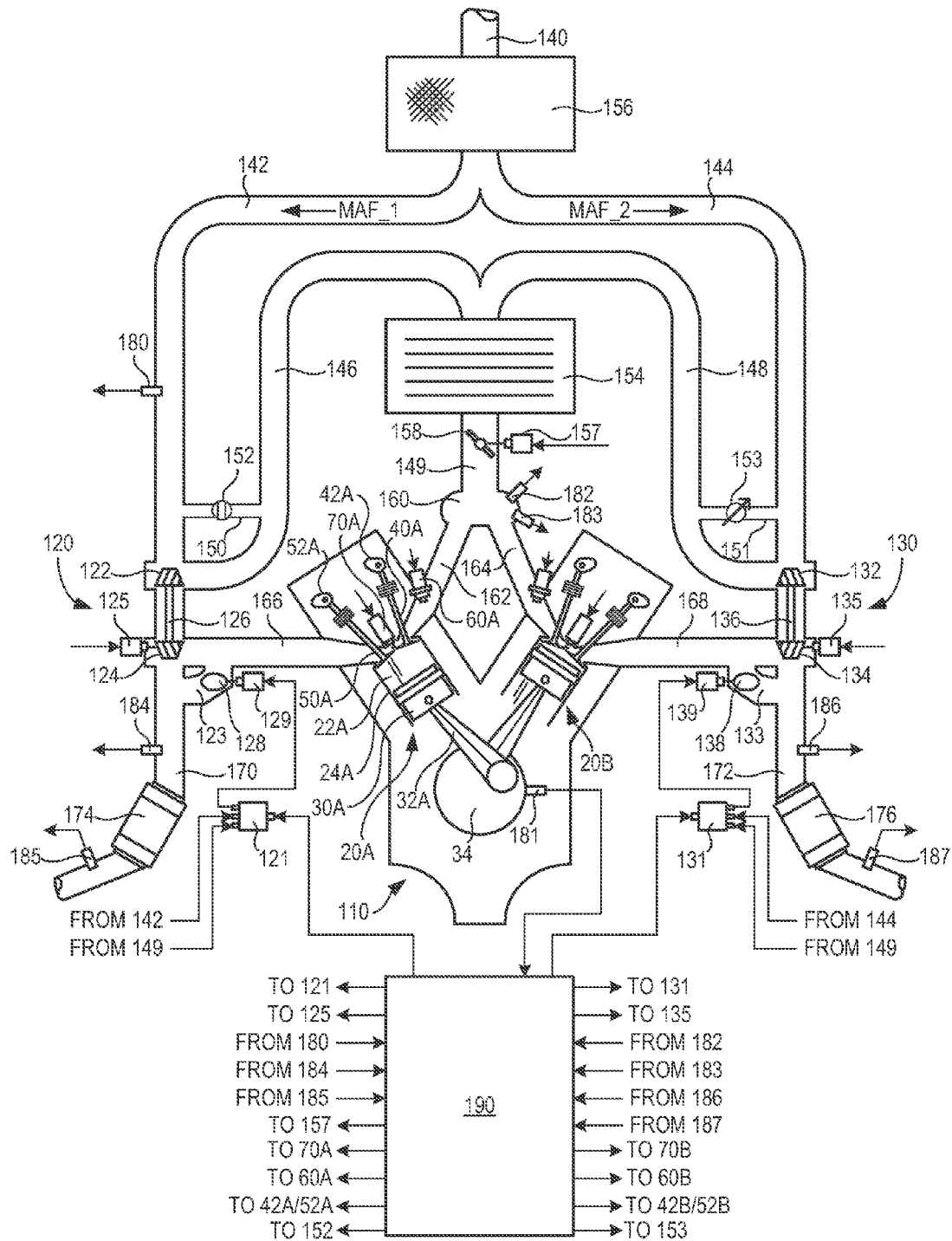
FIG. 1 shows a diagram of a multi-cylinder engine including a twin turbocharger according to an embodiment of the disclosure.
Figure 2:
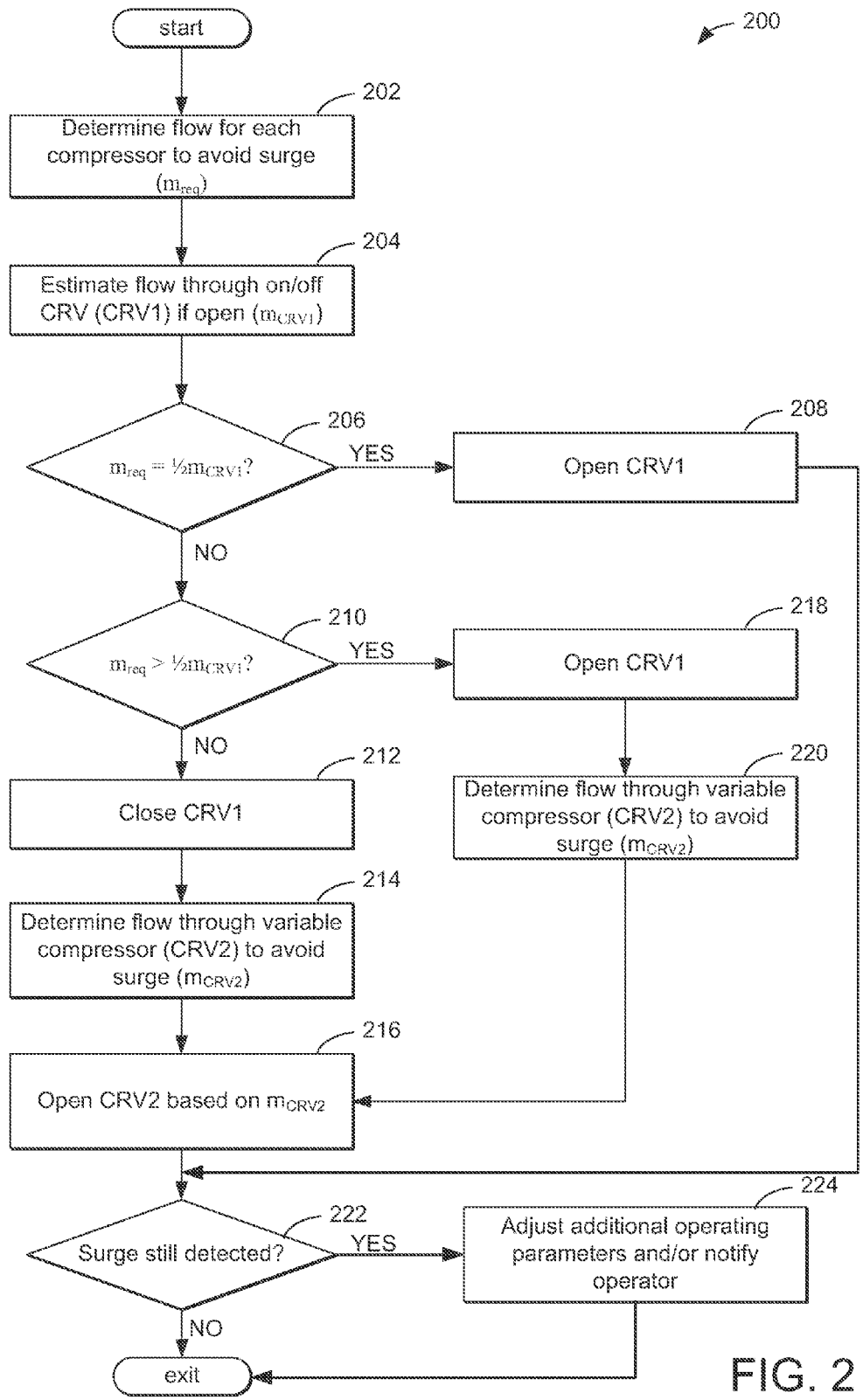
FIG. 2 shows a flow chart illustrating an example control routine for avoiding surge according to an embodiment of the present disclosure.

Turbo charging of an engine allows for smaller displacement engines with similar power output of larger engines. Extensively downsized engines often operate very near a surge boundary, where flow conditions across a compressor may push the compressor into surge, which can degrade the compressor. To avoid surge, a compressor recirculation valve may be opened to reduce pressure downstream of the compressor and increase flow through the compressor. However, particularly under transient conditions, the large flow amounts through the recirculation valve can lead to inadequate and/or delayed boost for the current power demands. To provide optimal flow amount through the recirculation valve, a traditional on/off recirculation valve may be replaced with a variably adjustable recirculation valve. The restriction level of the recirculation valve may be controlled based on pressure and flow across the compressor to avoid surge while maintaining adequate boost. FIG. 1 depicts an engine including a variably adjustable compressor recirculation valve and a control system that may carry out control routines for operating the recirculation valve. FIG. 2 is an example control routine for operating the variably adjustable recirculation valve as well as a traditional on/off recirculation valve based on a surge margin provided in FIG. 3.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144.

The first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160, where the intake air may be provided to the engine. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190.

As shown in FIG. 1, a first compressor recirculation valve (CRV1) 152 and a second compressor recirculation valve (CRV2) 153 may be provided to selectively recirculation the compressor stages of turbochargers 120 and 130 via recirculation passages 150, 151. CRV1 152 may be configured with only two restriction points such that the valve can be controlled to be either open or closed. CRV2 153 may be configured to have three or more restriction points such that it may be open, closed, or partially open. By having a plurality of restriction points, CRV2 153 may be controlled to provide a high resolution, continuously variable flow of air around compressor 132.

Engine 110 may include a plurality of cylinders two of which are shown in FIG. 1 as 20A and 20B. Note that in some examples, engine 110 can include more than two cylinders such as 3, 4, 5, 6, 8, 10 or more cylinders. These various cylinders can be equally divided and arranged in a vee configuration in-line with one of cylinders 20A and 20B. Cylinders 20A and 20B among other cylinders of the engine may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in other examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators (EVA) may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 20A as well as other cylinders can exhaust products of combustion via a common exhaust passage 166 and a second bank of cylinders including cylinder 20B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by actuator 129 as directed by control system 190. As one non-limiting example, control system 190 can adjust the position of actuator 129 via a solenoid valve 121. In this particular example, solenoid valve 121 receives a pressure difference for facilitating the actuation of wastegate 128 via actuator 129 from the difference in air pressures between intake passage 142 arranged upstream of compressor 122 and intake passage 149 arranged downstream of compressor 122. As indicated by FIG. 1, control system 190 communicates with actuator 129 via solenoid valve 121. However, it should be appreciated in other examples other suitable approaches for actuating wastegate 128 may be used.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by actuator 139 as directed by control system 190. The position of wastegate 138 may be controlled by actuator 139 as directed by control system 190. As one non-limiting example, control system 190 can adjust the position of actuator 139 via a solenoid valve 131. In this particular example, solenoid valve 131 receives a pressure difference for facilitating the actuation of wastegate 138 via actuator 139 from the difference in air pressures between intake passage 144 arranged upstream of compressor 132 and intake passage 149 arranged downstream of compressor 132. As indicated by FIG. 1, control system 190 communicates with actuator 139 via solenoid valve 131. However, it should be appreciated that in other examples other suitable approaches for actuating wastegate 138 may be used.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas sensors indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 142 and 144 can include a mass air flow sensor 180. In some examples, only one of intake passages 142 and 144 can include a mass air flow sensor. In still other examples, both of intake passages 142 and 144 can include a mass airflow sensor. A mass airflow sensor may include, as one example, a hot wire anemometer or other suitable device for measuring mass flow rate of the intake air. Mass airflow sensor 180 can communicate with control system 190 as shown in FIG. 1.

Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure. The controller may store instructions that may be executed in order to carry one or more control routines, such as the control routine described herein with respect to FIG. 2.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system. Thus, at least the spark timing, valve timing, and fuel injection timing can be actuated by the control system. Additionally, the control system may control the opening and closing of CRV1 152 and CRV2 153, as well as control the degree of opening (e.g., the restriction point) of CRV2 153.

While the embodiment depicted in FIG. 1 shows two turbochargers, with each compressor of each turbocharger regulated by a CRV, in some embodiments, the engine may include only one turbocharger. In this case, the compressor may be controlled by two CRVs arranged in parallel, wherein one CRV includes two restriction points and the other CRV includes at least three restriction points. The CRVs for the single compressor may be regulated similarly to the CRVs with two compressors, as described in more detail below.

FIG. 2 illustrates an example control routine 200 for controlling the opening and closing of two CRVs, such as CRV1 152 and CRV2 153, in order to prevent surge across two compressors. Routine 200 may be carried out by control system 190. At 202, a mass flow rate $\dot{m}_{req}$ through each compressor required to avoid surge is determined. The flow rate to avoid surge may be estimated based on a determined flow rate at the throttle. Because both compressors flow intake air into a common intake passage controlled by a throttle, the mass flow through the throttle, which may be determined by a sensor, such as sensor 182, may be used to determine the flow through each compressor, under steady state conditions. The mass flow rate through each compressor to avoid surge, $\dot{m}_{req}$, may be determined based on the equation:

$$\dot{m}_{req} = \frac{1}{2}\dot{m}_{thr} - \dot{m}_{SL}$$

where $\dot{m}_{thr}$ is the mass flow through the throttle and $\dot{m}_{SL}$ is the mass flow through the compressor at the surge line. The mass flow though the compressor at the surge line may be determined by a map stored in the control system, and may be based on the pressure ratio across the compressor.

Figure 3:
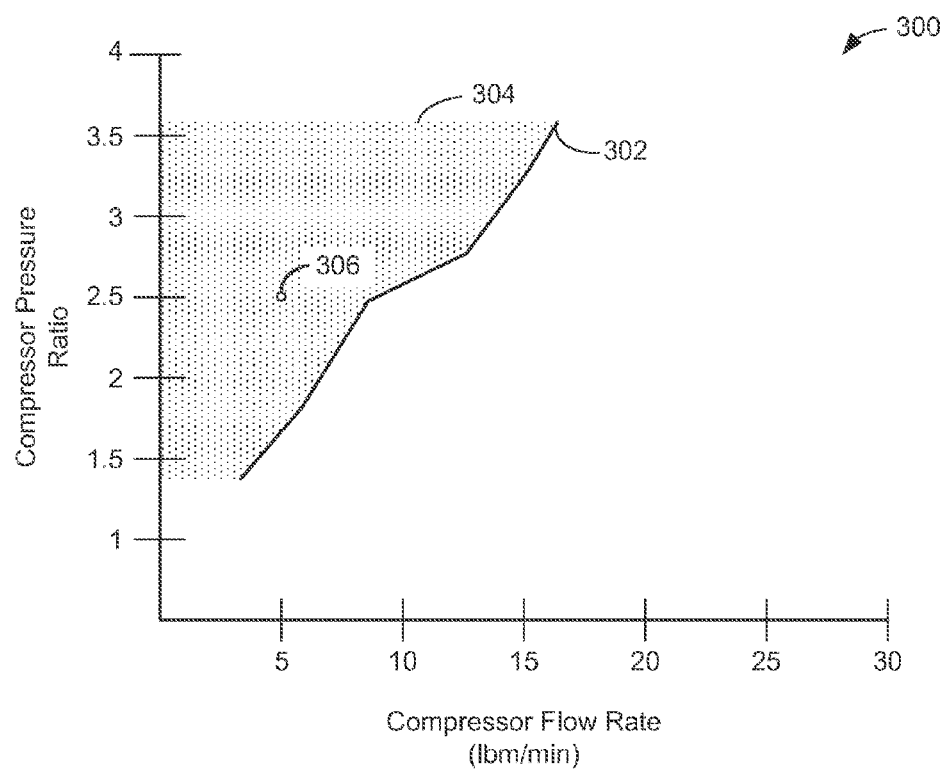
FIG. 3 is an example map illustrating a surge line.

An example map 300 is depicted in FIG. 3. Flow rate through the compressor is depicted on the x-axis while the pressure ratio of the compressor is depicted on the y-axis. The surge line is indicated by line 302. The pressure-flow coordinates to the left of the surge line 302 are in the surge region 304, where conditions are of low enough flow and high enough pressure to cause compressor surge. In one example, at a pressure ratio of 2.5 and flow rate of 5 lbm/min, indicated by dot 306, surge may occur. To avoid surge, the flow rate through the compressor may be increased to the reach the surge line, for example it may be increased by approximately 4 lbm/min to 9 lbm/min, to avoid surge. To increase the flow through the compressor, one or more CRVs may be opened, as explained below.

The equation above assumes an equal mass flow rate through each compressor before reaching the common throttle. However, in some conditions, flow through the compressors may not be equal. As such, compressor flow may not be represented by $$\frac{1}{2}\dot{m}_{thr}$$

as indicated, but may be represented by a portion of the flow through the throttle, $\alpha \dot{m}_{thr}$ for one compressor, and $(1-\alpha)\dot{m}_{thr}$ for the other compressor. $\alpha$ may be dependent on various factors, such as age of the compressor, friction, position of one or more wastegates of the turbines, etc. In other embodiments, $\alpha$ may be determined based on sensor measurements indicating the mass air flow in each separate intake line, for example as determined by sensor 180. For a system having only a single turbocharger, $\alpha=1$.

At 204, flow through the on/off CRV (CRV1) while open ($\dot{m}_{CRV1}$) is estimated. Flow through the open CRV1 may be estimated using, for example, a standard orifice flow equation:

$$\dot{m}_{CRV1} = CA\sqrt{2\rho(P_1 - P_2)}$$

where C=coefficient of orifice flow constant, A=cross-sectional area of the orifice, $\rho$=fluid density, $P_1$=pressure upstream of the CRV, and $P_2$=pressure downstream of the CRV.

At 206, it is determined if $$\dot{m}_{req} = \frac{1}{2}\dot{m}_{CRV1}$$

(or $\dot{m}_{req} = \dot{m}_{CRV1}$ for a single turbocharger). If yes, the flow rate increase through the compressor (e.g., compressor 122) that results from opening CRV1 is sufficient to avoid surge, and routine 200 proceeds to 208 to open the CRV1. After opening the CRV1, routine 200 proceeds to 222, explained in more detail below.

If the required flow rate is not equal to one-half the flow through the CRV1 while open, the amount of intake air that recirculates around compressor 122 and/or compressor 132 may be alternatively or additionally controlled by CRV2. As such, if the answer at 206 is no, routine 200 proceeds to 210 to determine if $$\dot{m}_{req} > \frac{1}{2}\dot{m}_{CRV1}$$

for systems with two turbochargers or $\dot{m}_{req} > \dot{m}_{CRV1}$ for systems with a single turbocharger. If $\dot{m}_{req}$ is not greater than $$\frac{1}{2}\dot{m}_{CRV1}$$

(or $\dot{m}_{CR1}$ for a single turbocharger), the flow rate through the compressor 122 that is increased as a result of opening CRV1 is more than is required to avoid surge, and may result in insufficient boost if opened. Under these conditions, CRV1 may be closed at 212 (or kept closed), and the variable CRV (CRV2) may be adjusted to provide the required mass flow increase through the second compressor (e.g., compressor 132). To do so, the flow through the second compressor ($\dot{m}_{CRV2}$) required to avoid surge may be calculated at 214 using the following equation for two turbochargers:

$$\dot{m}_{CRV2} = 2\dot{m}_{req}$$

Or, for single turbocharger systems:

$$\dot{m}_{CRV2} = \dot{m}_{req}$$

The CRV2 may be opened at 216. As the CRV2 includes a plurality of restriction points that enable a variable orifice cross-section, the restriction point that the CRV2 is set to, and thus the opening amount or orifice cross-section, A, may be determined by the standard orifice flow equation:

$$A = \frac{\dot{m}_{CRV2}}{C\sqrt{2\rho(P_1 - P_2)}}$$

If it is determined at 210 that $$\dot{m}_{req} > \frac{1}{2}\dot{m}_{CRV1}$$

(or that $\dot{m}_{req} > \dot{m}_{CRV1}$ for single turbocharger systems) routine 200 proceeds to 218 to open CRV1, as the required amount of flow through the compressors is greater than the flow increase provided by only the CRV1, and proceeds to 220 to determine the flow through the second compressor, controlled by CRV2, that is additionally required to avoid surge. This flow amount $\dot{m}_{CRV2}$ may be determined by the equation:

$$\dot{m}_{CRV2} = 2\dot{m}_{req} - \dot{m}_{CRV1}$$

Or for single turbochargers, based on the equation:

$$\dot{m}_{CRV2} = \dot{m}_{req} - \dot{m}_{CRV1}$$

Routine 200 then proceeds to 216 to open CRV2 based on the flow mCVR2 determined at 220, and set the restriction point based on orifice flow equation described above.

Both 216 and 208 proceed to 222 to determine if surge conditions are still present. This may include determining if the mass flow through the throttle has been adjusted accordingly, due to the adjustment of the CRV1 and/or CRV2, to avoid surge. Under some conditions, the CRVs may be controlled to be opened to avoid surge, but may not alleviate surge completely. This may be due to, for example, degraded recirculation valves or degraded compressors. If surge conditions are still detected at 222, routine 200 may proceed to 224 to adjust additional operating parameters to compensate for the degraded valves or compressor. For example, the CRV1 and/or CRV2 may be opened by a larger amount than originally indicated. In one example, a degraded variable recirculation valve may be commanded closed while a non-degraded recirculation valve may command open at the onset of compressor surge. Thus, the finer level of surge control provided via the variable surge valve is replaced with a courser level of surge control provided by a two state or on-off surge valve. Alternatively or additionally, one or more wastegates controlling the turbines coupled to the compressors may be adjusted to reduce compressor output to lower the pressure downstream of the compressor. In other embodiments, notification may be sent to an operator of the vehicle to service the engine. If surge conditions are not detected, or after adjusting the additional operating parameters, routine 200 exits.

Thus, the routine 200 described above with respect to FIG. 2 provides for an on/off CRV that, when open, increases flow through its respective compressor by a set amount. A second, variable CRV is provided that may increase flow through its respective compressor by a variable amount that is determined based on operating conditions. In the example routine 200, the flow rate through the compressors to avoid surge may be determined, and one or both of the CRVs may be opened to increase flow through the compressors to alleviate surge. For example, if the flow rate required to alleviate surge is above a first threshold but below a second threshold, the variable CRV may be operated. If the flow rate required to avoid surge is above the second threshold, both CRVs may be operated, while if the flow rate required to avoid surge is equal to the second threshold, only the on/off CRV may be operated. Under these conditions, the first threshold may be equal to zero, and the second threshold may be equal to the flow rate through the on/off CRV.

In other examples, the opening and closing of the CRVs may be at least partly determined based on engine load. For example, under low to medium load conditions, the on/off CRV may be closed, and the variable CRV may be controlled based on the pressure ratio and flow through the compressor controlled by the variable CRV. Under high load conditions, the on/off CRV may be opened, and if necessary, the variable CRV opened based on the pressure ratio and flow through the compressor. In this way, the control routine for opening and closing the CRVs may be simplified.

The routine of FIG. 2 may provide for a method for a turbocharger system having a first and second compressor comprising under a first condition, opening a first compressor recirculation valve (CRV) of the first compressor, under a second condition, opening the first CRV and adjusting a restriction amount of a second CRV of the second compressor, and under a third condition, closing the first CRV and adjusting the restriction amount of the second CRV.

In another embodiment, FIG. 2 may provide for a method for a turbocharged engine with a first and second compressor, comprising under high engine load, opening a first compressor recirculation valve of the first compressor and adjusting a second compressor recirculation valve of the second compressor based on a pressure ratio and mass flow rate of the second compressor, and under low to medium engine load, adjusting the second compressor recirculation valve of the second compressor based on the pressure ratio and mass flow rate of the second compressor.

It will be appreciated that the configurations and methods disclosed herein are exemplary in nature, and that these specific embodiments are not to be considered in a limiting sense, because numerous variations are possible. For example, the above technology can be applied to V-6, I-4, I-6, I-3, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a turbocharger system having a first and second compressor, comprising:
    under a first condition, opening a first compressor recirculation valve (CRV) of the first compressor;
    under a second condition, opening the first CRV and adjusting a restriction amount of a second CRV of the second compressor; and
    under a third condition, closing the first CRV and adjusting the restriction amount of the second CRV, the second condition including a difference between mass-flow through a throttle and mass-flow at a surge line being greater than a mass-flow through the first CRV.

2. The method of claim 1, wherein the first condition includes a difference between mass-flow through the throttle and mass-flow at the surge line being equal to the mass-flow through the first CRV.

3. The method of claim 1, wherein the third condition includes a difference between mass-flow through the throttle and mass-flow at the surge line being less than the mass-flow through the first CRV.

4. The method of claim 3, wherein the mass-flow at the surge line is determined based on a pressure ratio-mass flow map stored in a control system.

5. The method of claim 1, wherein under the second and third conditions, the restriction amount of the second CRV is adjusted to increase a mass-flow rate across the second compressor.

6. A method for a turbocharged engine with a first and second compressor, comprising:
    under high engine load, opening a first compressor recirculation valve of the first compressor and adjusting a second compressor recirculation valve of the second compressor based on a pressure ratio and mass-flow rate of the second compressor; and
    under low to medium engine load, adjusting the second compressor recirculation valve of the second compressor based on the pressure ratio and mass-flow rate of the second compressor.

7. The method of claim 6, further comprising under low to medium engine load, closing the first compressor recirculation valve.

8. The method of claim 6, wherein the first compressor recirculation valve includes two restriction levels and wherein the second compressor recirculation valve includes at least three restriction levels.

9. The method of claim 8, wherein under low to medium and high engine loads, adjusting the second compressor recirculation valve based on the pressure ratio and mass-flow rate of the second compressor further comprises decreasing a restriction amount of the second compressor recirculation valve to maintain mass-flow through the second compressor at a rate greater than a mass-flow rate at a surge line.

10. The method of claim 9, wherein the mass-flow rate at the surge line is dependent on the pressure ratio of the second compressor.

11. The method of claim 9, wherein the mass-flow at the surge line is determined based on a pressure ratio-mass flow map stored in a control system.

12. An engine system, comprising:
    an engine;
    first and second compressors supplying air to the engine;
    a first compressor recirculation valve adjustable to two restriction levels;
    a second compressor recirculation valve adjustable to three or more restriction levels; and
    a controller including instructions for operating the first and second compressor recirculation valves concurrently when a difference between mass-flow through a throttle upstream of the engine and mass-flow at a surge line is above a second threshold.

13. The engine system of claim 12, the controller further including instructions for operating the second compressor recirculation valve while not operating the first compressor recirculation valve.

14. The engine system of claim 13, wherein the controller includes instructions for operating the second compressor recirculation valve while not operating the first compressor recirculation valve when a difference between mass-flow through the throttle upstream of the engine and mass-flow at the surge line is above a first threshold but below the second threshold.

15. The engine system of claim 14, wherein operating the second compressor recirculation valve comprises adjusting a restriction level of the second compressor recirculation valve based on the difference between mass-flow through the throttle and mass-flow at the surge line.

16. The engine system of claim 12, wherein the second threshold is equal to a mass-flow through the first compressor recirculation valve, and wherein the controller includes instructions for operating the first compressor recirculation valve while not operating the second compressor recirculation valve when the difference between mass-flow through the throttle and mass-flow at the surge line is equal to the second threshold.

17. The engine system of claim 12, wherein operating the second compressor recirculation valve comprises adjusting a restriction level of the second compressor recirculation valve based on the difference between mass-flow through the throttle and mass-flow at the surge line and further based on mass-flow through the first compressor recirculation valve when the first compressor recirculation valve is open.

* * * * *